(12) United States Patent
Visser (10) Patent No.: US 7,084,343 B1
(45) Date of Patent: Aug. 1, 2006

(54) CORROSION PROTECTED COAXIAL CABLE

(75) Inventor: Leonard Visser, Orland Park, IL (US)

(73) Assignee: Andrew Corporation, Westchester, IL (US)

( * ) Notice: Subject to any disclaimer, the term of this patent is extended or adjusted under 35 U.S.C. 154(b) by 0 days.

(21) Appl. No.: 11/127,395

(22) Filed: May 12, 2005

(51) Int. Cl.
H01B 7/00 (2006.01)

(52) U.S. Cl. ................................. 174/28; 174/102 R (58) Field of Classification Search .................. 174/28, 174/36, 102 R, 107, 108
See application file for complete search history.

(56) References Cited

U.S. PATENT DOCUMENTS

| | | | | |
|---|---|---|---|---|
| 4,371,742 | A * | 2/1983 | Manly | 174/36 |
| 4,515,992 | A * | 5/1985 | Gupta | 174/102 R |
| 4,894,488 | A * | 1/1990 | Gupta | 174/28 |
| 5,355,720 | A | 10/1994 | Bailey | |
| 5,707,465 | A | 1/1998 | Bibber | |
| 5,949,018 | A * | 9/1999 | Esker | 174/23 R |
| 6,087,017 | A * | 7/2000 | Bibber | 428/458 |
| 6,127,441 | A * | 10/2000 | Sakamoto et al. | 521/91 |
| 6,246,006 | B1 * | 6/2001 | Hardin et al. | 174/106 R |
| 6,265,667 | B1 | 7/2001 | Stipes et al. | |
| 6,288,628 | B1 * | 9/2001 | Fujimori | 340/7.2 |
| 6,384,337 | B1 * | 5/2002 | Drum | 174/102 R |
| 6,596,393 | B1 * | 7/2003 | Houston et al. | 428/389 |
| 6,858,805 | B1 * | 2/2005 | Blew et al. | 174/100 |
| 2003/0044606 | A1 * | 3/2003 | Iskander | 428/375 |
| 2004/0007308 | A1 * | 1/2004 | Houston et al. | 156/54 |
| 2004/0222009 | A1 * | 11/2004 | Blew et al. | 174/110 F |

* cited by examiner

Primary Examiner—William H. Mayo, III
(74) Attorney, Agent, or Firm—Welsh & Katz (57) ABSTRACT

A corrosion-resistant radio-frequency coaxial cable includes an inner conductor, a layer of dielectric material surrounding the inner conductor and an outer conductor comprising a laminate surrounded by at least one braided aluminum wire sheath. The laminate includes at least one layer of aluminum foil bonded to a substrate, where substrate is longitudinally wrapped about the dielectric material. A jacket of weatherproofing material surrounds the braided sheath. A corrosion-inhibiting coating is applied to the aluminum foil of the laminate, which coating is formed of a wax acid polyester. The wax acid polyester includes the compounds of a polybasic acid or anhydride, a polyol, and an effective amount of a lanolin wax acid to form a wax polyester in situ coating. The wax acid polyester is formed by the in-situ reaction of an aqueous emulsion of a polybasic acid or anhydride, a polyol and an effective amount of a lanolin wax acid.

15 Claims, 2 Drawing Sheets

CORROSION PROTECTED COAXIAL CABLE

The present invention relates generally to an RF coaxial cable and more specifically to a corrosion-resistant RF coaxial cable and method for making such a cable.

BACKGROUND

Coaxial cables and other radio frequency (RF) cables are known in the art for transmitting high frequency signals, such as radio frequency signals, cable television signals, cellular telephone broadcast signals, residential satellite television signals, and the like. Known conventional coaxial cables are typically formed with an inner conductor of metal, either solid, clad or tubular, a dielectric material, either solid or foam, surrounding the inner conductor, and an electrically conductive shield surrounding the dielectric and serving as the outer conductor. The shield may be formed of braided wire sheath, and may also act in conjunction with an aluminum laminate to form the outer conductor.

The outer conductor may be one or more metal foil laminates combined with one or more wire braids, and may be a smooth or corrugated solid metal tube. Foil laminate outer conductors are typically made of one or more thin aluminum foil layers bonded to a plastic backing. However, because the foil layer is thin, it can easily become corroded if exposed to the elements, such as salt spray and water. Exposure to corrosive elements may occur if the protective jacket is damaged or otherwise breached. Additionally, the cable may have small gaps or tears or be otherwise improperly sealed where the connector is attached. When the thin outer conductor becomes corroded, the electrical properties of the cable degrade.

Some known cables attempt to increase corrosion resistance of the cable by a process known as "flooding," where a petroleum-based jelly is applied to the outer surface of the shield to physically block external elements from penetrating deeper into the cable. However, because the jelly is sticky, the installer experiences difficulty in applying the cable connectors to the cut and/or stripped end of the cable, and such flooding material makes it more difficult for the installer to make proper physical and electrical connections.

SUMMARY

Note that it is known to make coaxial RF cables as described above. However, making such coaxial cables corrosion resistant using a wax acid polyester described in detail below is not known. In one specific embodiment of the present invention a corrosion-resistant radio-frequency coaxial cable includes an inner conductor, a layer of a dielectric material surrounding the inner conductor, an outer conductor comprising a laminate surrounded by at least one braided aluminum wire sheath, where the laminate including at least one layer of aluminum foil bonded to a substrate, with the laminate being longitudinally wrapped about the dielectric material. A jacket of weather-proofing material then surrounds the braided sheath. A corrosion-inhibiting coating is applied to the aluminum foil of the laminate. The coating may be a wax acid polyester that includes the compounds of a polybasic acid or anhydride, a polyol, and an effective amount of a lanolin wax acid to form a wax polyester in situ coating. The coating may also be a wax acid polyester that is formed by the in-situ reaction of an aqueous emulsion of a polybasic acid or anhydride, a polyol and an effective amount of a lanolin wax acid.

The corrosion-resistant radio-frequency coaxial cable according to another specific embodiment may be formed by providing a metal inner conductor, surrounding the inner conductor with a layer of foam dielectric material, bonding at least one layer of aluminum foil to a substrate to form a laminate, mixing a corrosion-inhibiting liquid comprising a wax acid polyester, with talc to form a suspension, applying the suspension to the layer of aluminum foil of the laminate, drying the aluminum foil to form a corrosion-inhibiting coating thereon, longitudinally wrapping the laminate about the foam material along a longitudinal axis of the cable, surrounding the wrapped laminated with a braided aluminum wire sheath, covering the sheath with a layer of weather-proofing material. The amount of talc in the dried coating may be about 13 percent weight, but may also be between about 5 percent and 20 percent by weight.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

DETAILED DESCRIPTION

In this written description, the use of the disjunctive is intended to include the conjunctive. The use of definite or indefinite articles is not intended to indicate cardinality. In particular, a reference to "the" object or thing or "an" object or "a" thing is intended to also describe a plurality of such objects or things.

Figure 1:
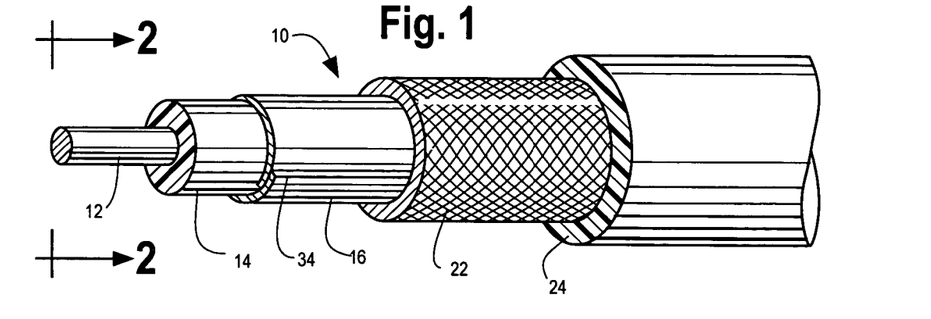
FIG. 1 is a perspective view of a specific embodiment of a coaxial cable according to the present invention.
Figure 2:
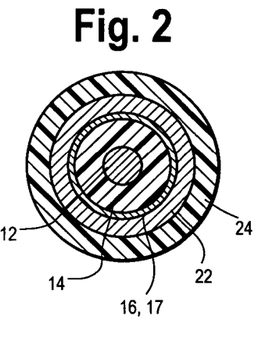
FIG. 2 is an end cross-sectional view of the cable of FIG. 1, taken along the line 2—2 of FIG. 1.

As shown in FIGS. 1 and 2, a specific embodiment of a coaxial cable 10 is shown. The cable 10 is preferably coaxial in construction and may be used for radio frequency (RF) applications. The cable 10 made in accordance with the subject invention is corrosion-resistant without being sticky, as portions of the cable are treated with an anti-corrosion coating, which is dry in the final product, as will be described below.

The cable 10 may include a) an inner or center conductor 12, preferably made of copper clad solid steel wire, b) a foam dielectric layer 14 covering and surrounding the center conductor, c) a layer of the foil laminate 16 or 17 covering the dielectric layer having a slight longitudinally overlapping construction, and d) a braided aluminum wire sheath 22 covering the foil laminate, preferably made of 34 gauge aluminum wire. The laminate 16 or 17 and the wire braid 22 together may form the outer conductor of the cable 10. A rugged outer jacket of polyvinylchloride (PVC) 24 or polyethylene may then be formed over the braided aluminum wire sheath 22 as the final layer. Note that the term "aluminum" as used herein is meant to also include aluminum alloys, as it is not required to use one-hundred percent aluminum in any of the applications described herein.

Figure 3:
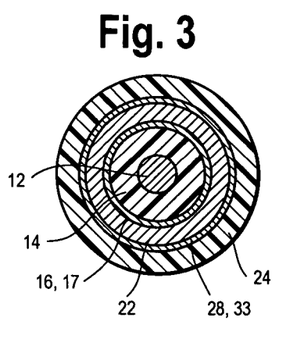
FIG. 3 is an end cross-sectional view of an alternate embodiment of a coaxial cable.

Alternatively, as shown in FIG. 3, the cable configuration of FIGS. 1 and 2 may have an additional or second layer of the aluminum foil laminate 28 or 33 covering the braided aluminum wire sheath 22. The PVC jacket 24 may cover and protect the second layer of the aluminum laminate 28 or 33. This construction may be referred to as a "tri-shield" construction.

Figure 4:
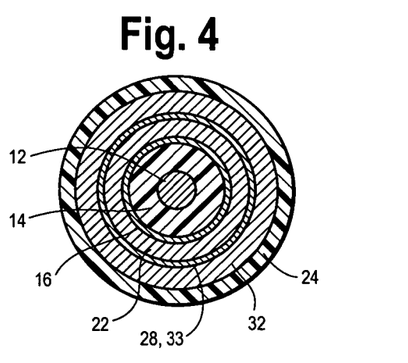
FIG. 4 is an end cross-sectional view of another alternate embodiment of a coaxial cable.

Another alternative is shown in FIG. 4. This construction is similar to the tri-shield configuration of FIG. 3, but may have an additional or second braided aluminum wire sheath 32 covering the second layer of the aluminum foil laminate 28 or 33. The PVC jacket 24 may cover and protect the second braided aluminum wire sheath 32. This construction may be referred to as a quad-shield construction.

Figure 5:
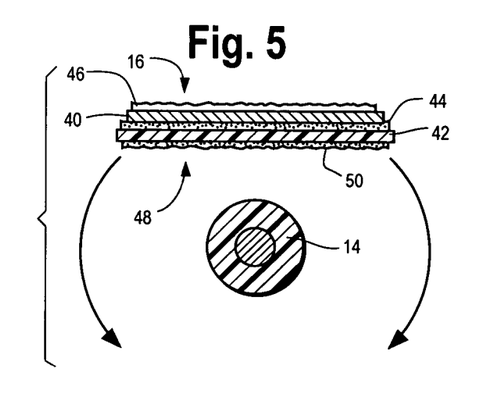
FIG. 5 is a side view of a specific embodiment of a laminate showing layers of material and direction of wrap over foam core.
Figure 5A:
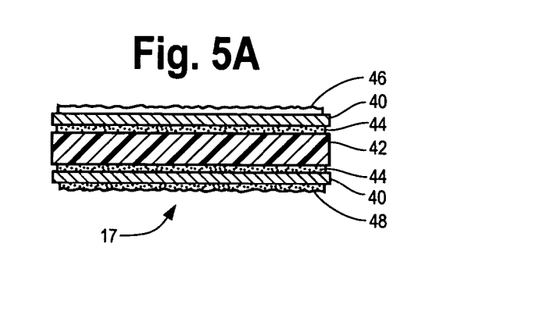
FIG. 5A is a side view of a specific alternate embodiment of a laminate showing layers of material.
Figure 6:
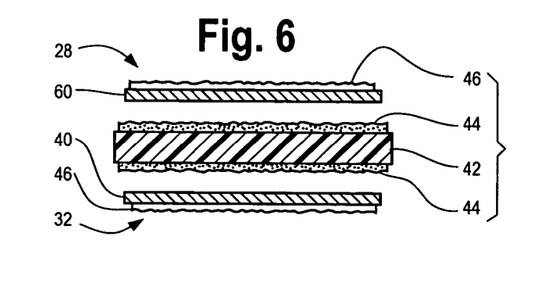
FIG. 6 is a side view of another specific alternate embodiment of a laminate showing layers of material.
Figure 6A:
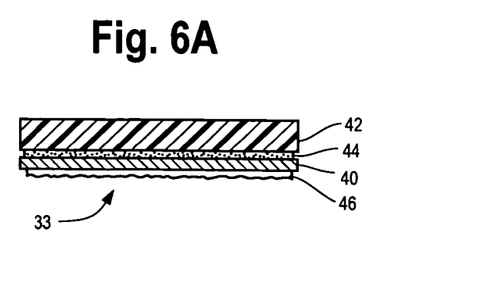
FIG. 6A is a side view of another specific alternate embodiment of a laminate showing layers of material.

The inner aluminum foil laminate 16 is shown in FIG. 5, while an alternate embodiment of the inner laminate 17 is shown in FIG. 5A. Further, the outer aluminum foil laminate 28 is shown in greater detail in FIG. 6, while an alternate embodiment of the outer laminate 33 is shown in greater detail in FIG. 6A. Preferably, the inner laminate 16 of the type shown in FIG. 5 or the alternative inner laminate 17, as shown in FIG. 5A, may be used with the cable 10 of FIGS. 1 and 2, while two aluminum foil laminates may be used with the cables of the types shown in FIGS. 3 and 4, namely an inner laminate plus an outer aluminum laminate 28, as shown in FIG. 6 or alternatively, the outer laminate 33 as shown in FIG. 6A. However, the laminate constructions shown in FIGS. 5, 5A, 6 and 6A may be used interchangeably with any of the cable constructions shown and described herein. In general, and for all of the cable constructions described, the aluminum foil laminate 16, 17 is preferably wrapped longitudinally about the foam dielectric 14 (or as a second laminate layer 28 or 33 surrounding the aluminum wire braid 22 in the cable of FIGS. 3 and 4) in a continuous linear feed process such that there is a small overlap 34 (FIG. 1) of the laminate layer about itself.

Note that when the laminate 16 (FIG. 5) or 17 (FIG. 5A) may be longitudinally wrapped about the foam 14 of the cable in FIGS. 1 and 2, a layer of chemical adhesive, such as EAA (ethylene-acrylic acid), may be preferably applied to the non-foil side of the substrate 42 to secure the laminate to the foam. However, when the laminate 28 of FIG. 6 or 33 of FIG. 6A is longitudinally wrapped about the foam 14 of the cables in FIGS. 3 and 4, no layer of adhesive is used. It is the subsequent braid layer that holds the longitudinally wrapped laminate in place without adhesive. For example, the PVC jacket 26 in the specific embodiment of the cable of FIG. 3 holds the wrapped laminate layer 28, 33 in place, while the second braided aluminum wire sheath 32 in the specific embodiment of the cable of FIG. 4 holds the wrapped laminate layer 28,33 in place.

As shown in FIG. 5, the laminate 16 may be made from a layer of aluminum foil 40 bonded to a plastic substrate 42, preferably a polyester or polyproplyene substrate, which may be about 1 mil (1/1000 inch) in thickness. Again, as mentioned above, the aluminum foil may be made of an aluminum foil alloy. However, any suitable thickness of substrate or any suitable substrate material may be used. The aluminum foil layer 40 is bonded to the substrate 42 using a suitable chemical adhesive 44, such as, for example, a cross-linked polyester adhesive. The aluminum foil 40 is preferably between 1/3 mil and 1 mil in thickness.

In accordance with an aspect of the present invention, the foil 40 in an RF cable outer conductor has a corrosion-resistant or corrosion-inhibiting coating 46 applied after bonding with the substrate. As will be described in detail below, the coating is used in the manufacture of the RF cable is a corrosion-resistant or corrosion-inhibiting chemical or liquid preferably applied to the foil (aluminum or aluminum alloy foil) after the foil is bonded to the substrate 42. The other side or the "non-foil" side 48 of the substrate 42 receives a thin layer of adhesive 50, such as, for example, EAA to facilitate longitudinal wrapping and adherence of the laminate about the particular cable component. Thus, the non-foil side 48 of the substrate 42 preferably contacts and adheres to the foam dielectric 14 in the cable construction of FIGS. 1, 2 and 3.

The alternate arrangement of the aluminum foil laminate 28 may also be used, as shown in FIG. 6. In this embodiment, the aluminum foil laminate 28 may include a second aluminum foil layer 60 bonded to the other side 48 of the substrate 42 so that both sides of the substrate have an aluminum foil layer. Bonding may be accomplished using the same or similar adhesive 44 as used in forming the laminate 16 of FIG. 5. In accordance with another aspect of the present invention, the anti-corrosion coating 46 in an RF coaxial cable may be applied to the outer surface of both aluminum foil layers 40, 60 using the techniques described herein. Unlike the laminate of FIG. 5, this laminate structure 32 has no final adhesive layer on the substrate, as there is no exposed outside surface of the substrate, as mentioned above. Note that in all of the figures, the various layers are not necessarily drawn to scale so as to clearly show the different layer components.

Figure 7:
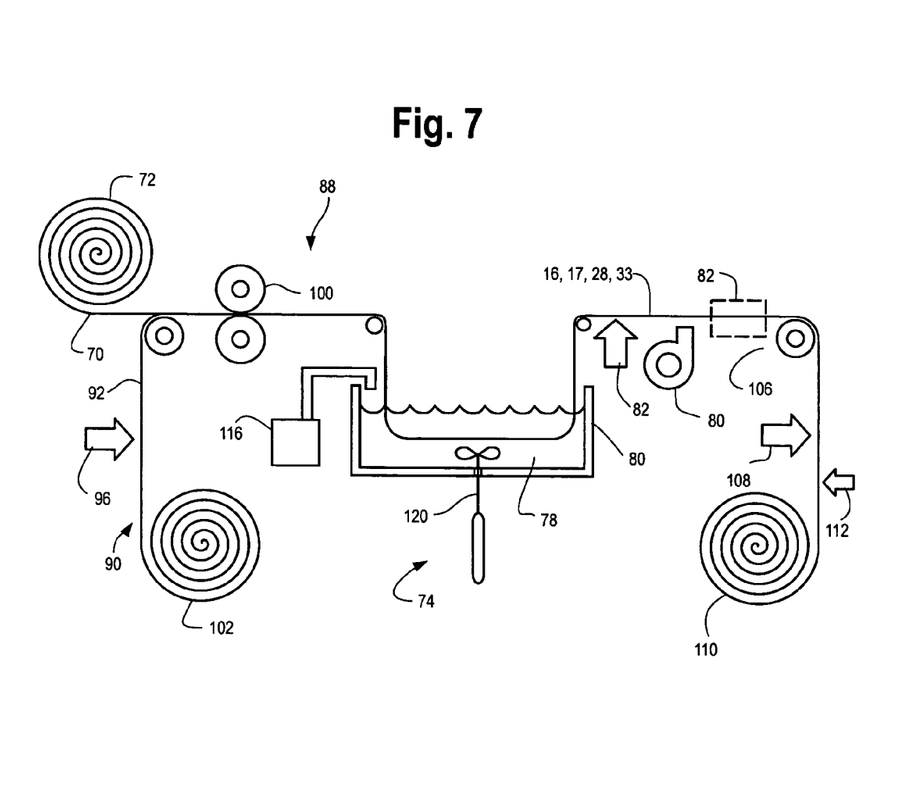
FIG. 7 is a pictorial representation of an specific embodiment of a process for making a coaxial cable.

Referring now to FIG. 7, the process of forming the laminate 16 of FIG. 5 is described, which process may be generalized to forming the laminate 28 of FIG. 6 by further adding steps of applying an additional aluminum foil layer to the substrate on the opposite side. The aluminum foil 70, which is preferably stored on a spool 72, may be unspooled and directed to a bonding station 88, where an adhesive coating mentioned above may first be applied to an outside surface 90 of the substrate 92 via an adhesive applicator 96. The adhesive may be sprayed on or applied by rollers or brushes, as is known in the art. The aluminum foil 70 is preferably bonded to the backing or substrate 90 via rollers 100 or other suitable mechanical pressure device processes, as is known in the art. Similarly, the substrate 92 may also be supplied to the bonding station on a spool 102. Once the aluminum foil 70 has been bonded to the substrate 92, it is next fed to a bath station 80 and treated with an anti-corrosive or corrosion-resistant/corrosion-inhibiting liquid 78. The laminate 16, 28 may be dipped in the bath 80 of the anti-corrosion liquid, or the chemical (liquid) may be sprayed onto the laminate using a spray nozzle 82, or a brush or roller (not shown) may apply the chemical, as is known in the art. Any suitable application method may be used. The laminate 16, 28 then proceeds to a drying station 80 where it may be dried or cured for about between one and twenty seconds via warm air blowers. A heated oven 82 may also be used, as is known in the art. Preferably, the drying temperature is about between 200–250 degrees F.

Once the laminate 16, 28 has dried, a further coating of suitable adhesive (for example, EAA) may be applied to an outside surface or "non-foil" surface 106 of the laminate 16 by another adhesive applicator 108. Next, the laminate, with its applied adhesive layer, is preferably rolled up or spooled on a spool 110 and cut to a fixed length by a cutting blade 112 for subsequent use in manufacturing the coaxial cable. Again, as mentioned above, the laminate of the construction depicted in FIG. 6 preferably does not receive this final layer of adhesive.

Note that the above process of manufacturing the foil laminate is preferably performed on a large scale. In that regard, the rolls of foil 72 and the rolls of the substrate 102 are on spools that are typically fifty-four inches wide and possibly thousands of feet long. During the cable manufacturing process, the laminate may be cut into an appropriate width, for example, one to two inches in width, and is then longitudinally wrapped around the dielectric foam layer.

Also note that when the laminate is spooled or coiled for subsequent use and/or distribution, as described above, the adhesive layer on the outside surface 106 of the substrate 92 may be in contact with the aluminum foil 70 layer of the previous coil. However, due to the nature and type of the adhesive and the subject process described below, no permanent bond is formed, and the layers may be peeled from the spool, that is, the laminate may be unspooled. Although the laminate may be generally unspooled without damage, unrolling the laminate may cause some difficulty because the corrosion-resistant coating tends to cause the layers to stick together to some degree. This may be referred to as "blocking," and if significant blocking occurs, problems may arise in the continuous run coaxial cable manufacturing line, which may cause the line to stop if the laminate tears or is otherwise significantly damaged. This can be a very expensive in terms of money, productivity and efficiency.

In use on and with RF coaxial cables according to an aspect of the present invention, to prevent or significantly reduce the affects of blocking, a quantity of talc may be added to the corrosion-resistant chemical bath 80 before application of the solution to the aluminum foil 70. As shown in FIG. 7, a talc adding station 116 is shown. After a corrosion-resistant liquid according to the present invention and the talc have been mixed, the mixture or solution may be applied to the laminate, as described above. During the drying process, the talc suspended in the liquid applied to the laminate migrates to the surface of the coating as it dries, and provides physical separation of the layers when coiled upon themselves. Thus, the talc acts as an additional layer on top of the coating so that when the entire laminate is coiled, it is the talc layer that is also in contact with the adhesive backing of the substrate 92. This reduces the adhesion between the adhesive layer on the non-foil side 106 of the substrate and the corrosion-resistant coating on the aluminum foil 70, thus preventing or significantly reducing blocking or tearing of the laminate when unrolled for application on the fabrication line.

The talc may be added to the corrosion-inhibiting liquid of the present invention, preferably in powder form, and is preferably stirred by a mixing blade 120 or other suitable mechanical device to cause the talc to remain in suspension. Preferably, the solution of the corrosion-resistant liquid and the talc is continuously stirred or circulated via a suitable pump (not shown) to keep the solids in suspension.

In accordance with an aspect of the present invention, a corrosion-inhibiting liquid is preferably a water based chemical, as will be described below. The liquid may contain about 11% solids by weight. However, the amount of solids or the active and inert ingredients may range from between 5% to 20% solids by weight. Once the talc has been added to the liquid and allowed to dry, the final resulting coating preferably contains about 13% talc by weight. However, the amount of talc in the final dried coating may be between 5% to 25% by weight of the solids.

Another problem that may occur when applying thin coatings to metal foil is known as "blooming." Blooming occurs when the material coating is not uniform, and may appear to be "creeping" away from some defect or imperfection on the aluminum foil. This is likely to occur during the drying process. Areas of the aluminum foil surface that exhibit blooming or are otherwise not covered with the coating will not provide adequate corrosion protection at that location. It is also desirable to apply the coating in a uniform thickness for quality control and aesthetic reasons. It has been found that the above-described technique of adding talc to the corrosion-resistant liquid also reduces or eliminates the blooming problem mentioned above.

As mentioned above, the outer conductor may be formed by the combination of an aluminum foil laminate and one or more braided aluminum wire sheaths. There must be electrical conductivity between the two components. However, the corrosion-resistant coating according to the present invention acts to a slight degree as an insulator. If the insulating ability of the coating were too great, the electrical properties of the cable would be degraded. Thus, to achieve the dual purpose of providing a corrosion-resistant coating, while still preserving the desired level of electrical conductivity between the laminate and the sheath or sheaths, an optimal thickness of the coating applied to the aluminum foil is preferably about 0.05 mils (0.00005 inches) thick. However, the thickness of the coating may range from about 0.01 mils to about 0.1 mil in thickness.

Note that in addition to or in lieu of applying the corrosion-resistant coating of the invention to the aluminum foil of the laminate, the corrosion-inhibiting coating may alternatively be applied to the aluminum braided wire sheath 22 (FIGS. 1–2). Because the sheath 22 tends to be the layer closest to the surface of the cable, that is, in many of the above cable construction embodiments it is adjacent the PVC jacket 24, the sheath would be exposed to the elements first should the jacket be breached. In that regard, this "first line of defense" substantially slows down or prevents corrosion from "eating" deeper into the cable, and thus aids in preventing degradation of the electrical properties of the cable even if some damage occurs. The corrosion-inhibiting solution, which forms the coating, may be applied by methods, such as spraying, wiping or dipping. The coating may be applied to the individual wires of the aluminum sheath prior to braiding. The above-described thickness values for the corrosion-resistant coating of the present invention as applied to the foil are also applicable to the thickness values for the coating as applied to braided aluminum wire.

Figure 8:
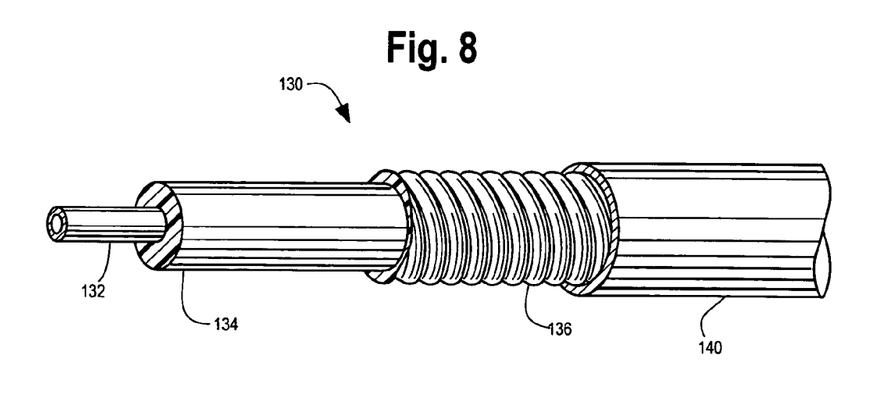
FIG. 8 is a perspective view of another alternate embodiment of a coaxial cable having corrugations.

In an alternate cable construction as shown in FIG. 8, a corrugated cable 130 may be used. The corrugated coaxial cable 130 may include an inner conductor 132 at the center of the cable, which may be surrounded by a foam layer or body 134. An outer conductor 136 may then surround the foam layer, and a weather-proof jacket 140 may be provided over the outer conductor. Application Ser. No. 10/131,747 filed Apr. 24, 2002, issued as U.S. Pat. No. 6,693,241 on Feb. 17, 2004, entitled Low-Cost, High Performance, Moisture-Blocking, Coaxial Cable And Manufacturing Method, describes the corrugated cable 130 in detail, which application is owned by the assignee of present invention, and is hereby incorporated by reference in its entirety.

The inner conductor 132 may be generally made of a conducting material, such as copper, copper-clad steel, aluminum or copper-clad aluminum. The outer conductor 136 is preferably made from thin metal, such as aluminum foil or heaver gauge aluminum sheet, or aluminum alloy. The outer conductor 136 is preferably about 10 mils in thickness, but any suitable gauge metal may be used depending upon the application and the size of the cable 130. In one specific embodiment, the outer conductor 136 is preferably a continuous aluminum foil layer (or aluminum foil alloy, as interchangeably used herein) and may be initially formed from a strip of metal foil, which may be fed from roll or spool of material during the manufacturing process. The outer conductor 136 is preferably longitudinally wrapped during manufacture and the edges are welded together. Alternately, the outer conductor 136 may have minimal overlap and the seam may be welded or spot welded. Any suitable process may be used to secure the outer conductor in place.

The outer conductor 136 may be smooth, but may also be corrugated to provide additional cable flexibility. It may be helically or spirally corrugated or it may be ribbed. If the outer conductor 136 is corrugated, the corrugation process is applied after the outer conductor is longitudinally wrapped about the foam portion 134. Because the outer conductor 136 may be formed of aluminum or aluminum alloy, it is suitable for treatment with the above-described corrosion-resistant liquid.

In accordance with an aspect of the present invention, a corrosion-resistant liquid may be sprayed on or brushed on to the cable after corrugation, but alternatively, the cable may be dipped in a bath of the corrosion-resistant liquid and dried prior to being jacketed. The outer conductor 136 may be cleaned first to remove any lubricants used in the corrugation process prior to application of corrosion-resistant liquid.

Turning now to the corrosion-resistant liquid to be applied to the aluminum foil or to the aluminum wire braid according to the present invention, a detailed description of its composition and formulation is provided below. The below description is incorporated from U.S. Pat. No. 6,087,017, Ser. No. 09/097,617, issued Jul. 11, 2000 and assigned to Sanchem, Inc. of Chicago, Ill. The corrosion resistant coating described herein is commercially available from Sanchem, Inc. of Chicago, Ill. under the trade name of SAFEGARD.

The corrosion-resistant coating of the present invention may be characterized by not containing chromium. More particularly, the corrosion-resistant coating is a lanolin wax polyester. The corrosion-resistant coating relates to a composition of coating an aluminum or aluminum alloy with a non-chromium corrosion-resistant composition having therein a lanolin wax acid that forms in-situ on the aluminum or aluminum alloy or conversion coated aluminum or aluminum alloy surface a lanolin wax polyester coating.

By way of background, the chemical conversion coating of aluminum, and its alloys, is known in the art as a process whereby the surface of the metal is chemically converted to a surface that more easily accepts applied coatings, i.e. paint, and increases the corrosion resistance of the metal. The corrosion resistance aspect of the art is of particular importance in the aircraft industry as they frequently employ aluminum alloys that are easily corroded.

An accepted process involves the use of chromates and or dichromates to produce a surface coating of acid based chromium. As these are rather toxic, and have a considerable environmental concern, the chromate based conversion coatings are being displaced by less toxic materials. Alternative conversion coatings which can be used are based on potassium permanganate and zirconium compounds, either by themselves or incorporated in a polymer system.

The general disadvantage of using a polyester coating as a coating for the aluminum and aluminum alloy surfaces is that the polyesters are generally easily hydrolyzed and/or broken down in wet humid environments. The corrosion-resistant chemical is directed toward the corrosion resistant characteristics of a wax polyester film formed in-situ on the aluminum and aluminum alloy which is used independently and/or incorporates or covers a non-chromium existing conversion coating such as permanganate and zirconium. The preferred coating is water based and as a result generates no volatile organic carbon compounds. In addition, it does not contain any known toxic substances. The coating is very thin and due to its thinness is sufficiently electrically conductive for use in aerospace applications. The term aluminum alloy also covers what some may call a zinc alloy. That is, an alloy having at least 3.0% aluminum and more than 90% zinc.

The corrosion-resistant chemical utilizes an aqueous aluminum coating composition to provide an outer protective coating for an anodized or non-anodized aluminum or aluminum alloy which may also have a conversion coating thereon. The protective coating has ingredients thereof a polybasic acid, a polyol, and a lanolin wax acid to form in-situ with the polybasic acid, polyol and lanolin wax acid, a lanolin wax polyester.

The corrosion-resistant chemical applied to RF coaxial cables in accordance with the present invention is useful with anodized or non-anodized aluminum or aluminum alloy article which may have thereon a conversion coating, an outer protective coating of a lanolin wax polyester formed from the in-situ reaction of an aqueous aluminum coating composition having as the essential ingredients thereof a polybasic acid, a polyol, and a lanolin wax acid.

The corrosion-resistant chemical is also useful in treating an anodized or non-anodized aluminum or aluminum alloy substrate, which may have a conversion coating for corrosion resistance, by coating said substrate with a film of a water-based emulsion of a polybasic acid and a polyol and a lanolin wax acid, heating the coated substrates to a temperature of at least 200 degrees F. for a sufficient time to form a lanolin wax polyester outer protective coating on said substrate.

An anodized or non-anodized aluminum or aluminum alloy is afforded corrosion resistance by having thereon an outer protective coating of a lanolin wax polyester. The aluminum or aluminum alloy may have thereon an intermediate conversion coating.

As noted above, the aluminum alloys in RF coaxial cables having at least 3% by weight aluminum and more than 90% by weight zinc are also part of this invention. The preferred aluminum alloys are those containing at least 80% by weight Al and the Al— —Zn alloys containing by weight at least 3% Al and preferably 3–7% Al and 93–97% Zn. The Al—Zn alloys which are protected by the protective coating are the Zamak cast alloys by Bryan Die Cast Products, Inc. of Bryan, Ohio, which contain at least 3% by weight Al.

The subject protective coating used on RF coaxial cables in accordance with the present invention does require the cable to have aluminum as part of the composition. The aluminum alloy substrate is chosen so that the protective lanolin wax polyester protective coating formed in-situ using a lanolin wax acid will provide a lanolin wax polyester protective coating that will show no signs of corrosion when subjected to a salt fog at 95 degrees F., according to ASTM method B-117 for at least 100 hrs. will show no signs of corrosion and only minor signs of corrosion when subjected for 168 hrs.

The lanolin wax polyesters may be formed by the reaction of an aqueous emulsion of a polybasic acid, a polyol with two or more alcohol or OH groups, and a lanolin wax acid. Heat may be used to form the lanolin wax polyester polymer. To aid the reaction, the emulsion may contain cross-linking agents, such as amino resins, to increase the rate of reaction or lower the required reaction temperature. It has been added to the normal mixture of polyols and polybasic acids that form polyesters, a lanolin wax acid that is dispersible in water to give a softer more elastic, and corrosion resistant wax polyester product. A composition utilized to form a lanolin wax polyester may be an aqueous emulsion of 0.5 to 20 parts by weight polybasic acid or anhydride
0.5 to 3.0 parts by weight polyol
0.1 to 3.0 parts by weight lanolin wax acid having an overall acid number of 100 to 160.

The polybasic acid or anhydride is preferably a $C_8$–$C_{25}$ compound. A widely used organic polybasic acid for forming polyesters is the trimellitic acid also known as 1,2,4 benzenetricarboxylic acid or anhydride. This is generally sold and used as the anhydride because the dry form of the acid will revert to the anhydride. The material is relatively low in cost, rather reactive and has a low melting point. Other useful polybasic acids and their anhydrides are isophthalic acid and synthetic polyethylene acrylic acid copolymers. In general, most polybasic organic acids may be used.

The polyol is preferably a $C_4$–$C_{10}$ polyol. The most preferred polyols are: dipropylene glycol, triethylene glycol, diethylene glycol, hydrogenated bisphenol, and 1,4 cyclohexanedimethanol. In general, most any polyol may be used. The lanolin wax acid is a complex mixture containing various acids and alcohols and is rich in high molecular weight, straight-chain and branched chain acids and alcohols. The lanolin wax acid of this invention has an overall acid number of 100 to 160 and preferably from 125–135; and an overall hydroxyl number of 30 to 100 and preferably from 65–90. An appropriate lanolin wax acid that can be used and which is used in the examples is NATRALUBE 210 purchased from The Fanning Corporation, Chicago, Ill. This is a solid form. This has an overall acid number of 125–135, a saponification number of 140–160, a hydroxyl number of 65–90, a maximum iodine number of 10 and a softening point of 50–60 degrees C. Also this is insoluble in water and generally requires an emulsifying agent to keep it dispersed in water. Another lanolin wax acid that can be used is Amerlate LFA sold by Amerchol, a unit of CPC International, Inc., Edison, N.J., has an acid value of 125–150, hydroxyl value of 40–60, a saponification value of 155–175, a melting range of 55–62 degrees C., and iodine value of 10 max.

The aqueous emulsion composition generally contains 75 to 96% water and is such that when it is coated on the surface of the aluminum or aluminum alloy it forms a thin film. The coating may be applied by any suitable means such as immersion, brushing, or spraying the emulsion on the aluminum or aluminum alloy surface or the surface of a non-chromium conversion coated aluminum or aluminum alloy substrate. The thin emulsion film is then heated to a temperature of greater than 200 degrees F. for a sufficient time to cause the polybasic acid or anhydride, polyol and lanolin wax acid to react and at least partially cross-link with each other to form the lanolin wax polyester.

The advantages gained by using the present lanolin wax polyester as an outer seal coating application are that the formed polyester has many highly polar polyester groups that provide good adhesion to the anodized or non-anodized aluminum or aluminum alloy surfaces and provide adhesion to any non-chromium intermediate conversion coatings thereon such as permanganate and zirconium.

The lanolin wax polyester is rich in polar ester and unreacted acid and alcohol groups and at the same time has a great deal of resistance to hydrolysis. This gives corrosion resistance and adherence to metal surfaces at the same time. The following examples illustrate the processes for bringing this about. As noted above, polyesters in general are easily hydrolyzed or broken down in wet humid environments. Generally, those made resistant to hydrolysis result in a decrease in polymer adhesion to the aluminum or aluminum alloy surfaces.

Various types of permanganate conversion coating are shown in U.S. Pat. Nos. 4,711,667, 4,755,224, 4,878,963, 4,895,608, 4,988,396, 5,358,623, 5,437,740, 5,554,231, 5,707,465. The zirconium conversion coating for aluminum alloys is shown in U.S. Pat. No. 4,191,596 and this patent is incorporated herein.

The aluminum alloy used in the following examples is the "2024-T3" alloy because this alloy represents an extreme example of corrosion susceptibility. If a composition can provide corrosion protection for this alloy it is generally considered as being able to provide protection for any aluminum or aluminum alloy. On average, the 2024-T3 alloy contains: 4.4% copper, 0.6% manganese, 1.5% magnesium, 2.0% nickel, and 91.5% aluminum.

Examples 1 and 2 show that without the lanolin wax acid, the formed polyester does not adequately protect the aluminum alloy. In all examples percentages are percentages by weight.

EXAMPLE 1

A three inch by ten inch panel of "2024-T3" aluminum alloy was cleaned in mildly alkaline cleaner at 150–160 degrees F. for 3 minutes, rinsed in deionized water and deoxidized in a solution of 10% nitric acid and 3% sodium bromate at 120 degrees F. for five minutes. The panel was then rinsed in deionized water and dried. The cleaned panel was then immersed in with the following water based emulsion at room temperature for less than 1 minute. The water based emulsion was 2.5% dipropylene glycol;
2.2% trimellitic anhydride;
2.5% of an equal molar mixture of linseed fatty acids, oleic fatty acids, stearic fatty acid and tung oil acids;
0.80% 2-amino-2-methyl-1-propanol; and
92.0% mixture of water and enough ammonia to reach a pH of 9.0–9.5.

The panel was removed from the emulsion and allowed to dry at room temperature for about 10 minutes. Then the dried coated panel was placed in a heat chamber which was at a temperature of 275–300 degrees F. The panel remained in the heat chamber for about 15 minutes. The panel was removed and had thereon a thin polyester coating. The panel was allowed to cool. The cooled panel was then placed in a salt fog at 95 degrees F. according to ASTM method B-117. After 24 hours of exposure to this salt fog, the panel showed extensive signs of corrosion.

EXAMPLE 2

A three inch by ten inch panel of 2024-T3 aluminum alloy was cleaned according to Example 1. The procedure of Example 1 was followed, except that after being immersed and dried, the dried coated panel was placed in a heat chamber which was at a temperature of 450–475 degrees F. to more completely form the polyester and incorporate the fatty acids. The panel remained in the heat chamber for about 15 minutes. The panel was removed and had thereon a thin polyester coating. The polyester coated panel was allowed to cool. The cooled panel was then placed in a salt fog at 95 degrees F. according to ASTM method B-117. After 24 hours exposure to this salt fog the panel showed substantial signs of corrosion.

EXAMPLE 3

A three inch by ten inch panel of 2024-T3 aluminum alloy was cleaned according to Example 1. The panel was then immersed in the following water based emulsion:

2.5% Dipropylene glycol;
2.2% trimellitic anhydride;
2.5% of Natralube 210,
0.56% 2-Amino-2-Methyl-1-propanol (emulsification agent); and
92.24% mixture of water and enough ammonia to reach a pH of 9.0–9.5.

After approximately 1 minute the panel was removed from the emulsion and allowed to dry at room temperature for about 10 minutes. The dried coated panel was then placed in a heat chamber which was at a temperature of 275–300 degrees F. The panel remained in the heat chamber for about 15 minutes. The panel was removed and had thereon a thin lanolin wax polyester coating. The lanolin wax polyester coated panel was allowed to cool. The cooled panel was then placed in a salt fog at 95 degrees F. according to ASTM method B-117. After 168 hours of exposure to this salt fog, the panel showed only minor signs of corrosion.

EXAMPLE 4

A three inch by ten inch panel of 2024-T3 aluminum alloy was cleaned according to Example 1. The panel was then immersed in the following water based emulsion:

2.5% Dipropylene glycol;
3.0% isophthalic acid;
2.5% of Natralube 210;
0.56% 2-Amino-2-Methyl-1-propanol (emulsification agent); and
91.44% mixture of water and enough ammonia to reach a pH of 9.0–9.5.

After approximately 1 minute the panel was removed from the emulsion and allowed to dry at room temperature for about 10 minutes. The dried coated panel was then placed in a heat chamber which was at a temperature of 275–300 degrees F. The panel remained in the heat chamber for about 15 minutes. The panel was removed and had thereon a thin lanolin wax polyester coating. The lanolin wax polyester coated panel was allowed to cool. The cooled panel was then placed in a salt fog at 95 degrees F. according to ASTM method B-117. After 168 hours of exposure to this salt fog, the panel showed only minor signs of corrosion.

EXAMPLE 5

A three inch by ten inch panel of 2024-T3 aluminum alloy was cleaned according to Example 1. The panel was then immersed in the following water based emulsion:

3.0% 1,4-cyclohexanedimethanol;
2.2% trimellitic anhydride;
2.5% Natralube 210;
0.56% 2-Amino-2-Methyl-1-propanol (emulsification agent); and
91.74% mixture of water and enough ammonia to reach a pH of 9.0–9.5.

After approximately 1 minute the panel was removed from the emulsion and allowed to dry at room temperature for about 10 minutes. The dried coated panel was then placed in a heat chamber which was at a temperature of 275–300 degrees F. The panel remained in the heat chamber for about 15 minutes. The panel was removed and had thereon a thin lanolin wax polyester coating. The lanolin wax polyester coated panel was allowed to cool. The cooled panel was then placed in a salt fog at 95 degrees F. according to ASTM method B-117. After 168 hours of exposure to this salt fog, the panel showed only minor signs of corrosion.

EXAMPLE 6

A three inch by ten inch panel of 2024-T3 aluminum alloy was cleaned according to Example 1. The Panel was then immersed in the following water based emulsion:

2.5% Dipropylene glycol;
2.2% trimellitic anhydride;
2.5% Natralube 210
0.56% 2-Amino-2-Methyl-1-propanol (emulsification agent); and
91.74% mixture of water and enough ammonia to reach a pH of 9.0–9.5.

After approximately 1 minute the panel was removed from the emulsion and allowed to dry at room temperature for about 10 minutes. The dried coated panel was then placed in a heat chamber which was at a temperature of 450–475 degrees F. The panel remained in the heat chamber for about 15 minutes. The panel was removed and had thereon a thin lanolin wax polyester coating. The lanolin wax polyester coated panel was allowed to cool. The cooled panel was then placed in a salt fog at 95 degrees F. according to ASTM method B-117. After 168 hours of exposure to this salt fog, the panel showed only minor signs of corrosion.

EXAMPLE 7

A 3*10 inch panel of 2024-T3 aluminum alloy was cleaned in a mild alkaline cleaner at 150–160 degrees F. for 3 minutes, rinsed in deionized water and deoxidized in a solution of 10% nitric acid and 3% sodium bromate at 120 degrees F. for 5 minutes. The panel was then rinsed in deionized water. The cleaned aluminum alloy panel was immersed for about 1 minute at about 150 degrees F. in a aqueous solution of 0.3% potassium permanganate and 0.01% lithium nitrate, to form a permanganate conversion coating on the panel. The permanganate conversion coated panel was removed from the solution, rinsed with warm water and dried. The coated panel was then immersed in the following water based emulsion:

2.5% Dipropylene glycol;
2.2% trimellitic anhydride;
2.5% Natralube 210, 0.56% 2-Amino-2-Methyl-1-propanol (emulsification agent); and 92.24% mixture of water and enough ammonia to reach a pH of 9.0–9.5.

After approximately 1 minute the panel was removed from the emulsion and allowed to dry at room temperature for about 10 minutes. The dried coated panel was then placed in a heat chamber which was at a temperature of 275–300 degrees F. The panel remained in the heat chamber for about 15 minutes. The panel was removed and had thereon a thin lanolin wax polyester coating. The lanolin wax polyester coated panel was allowed to cool. The cooled panel was then placed in a salt fog at 95 degrees F. according to ASTM method B-117. After 336 hours of exposure to this salt fog, the lanolin polyester coated panel showed no signs of pitting.

EXAMPLE 8

The procedure of Example 7 was followed to form a permanganate conversion coating on the 2024-T3 aluminum alloy panel with the aqueous solution of 0.3% potassium permanganate and 0.01% lithium nitrate. The permanganate coated panel was then immersed in the following water based emulsion:

3.0% 1,4cyclohexanedimethanol;
2.2% trimellitic anhydride;
2.5% Natralube 120;
0.56% 2-Amino-2-Methyl-1-propanol (emulsification agent); and
91.74% mixture of water and enough ammonia to reach a pH of 9.0–9.5.

After approximately 1 minute the panel was removed from the emulsion and allowed to dry at room temperature for about 10 minutes. The dried coated panel was then placed in a heat chamber which was at a temperature of 275–300 degrees F. The panel remained in the heat chamber for about 15 minutes. The panel was removed and had thereon a thin lanolin wax polyester coating. The lanolin wax polyester coated panel was allowed to cool. The cooled panel was then placed in a salt fog at 95 degrees F. according to ASTM method B-117. After 336 hours of exposure to this salt fog, the panel showed no signs of pitting.

EXAMPLE 9

A 3*10 inch panel of 2024-T3 aluminum alloy was cleaned and deoxidized according to Example 7. The cleaned aluminum panel was immersed for less than 1 minute in a solution of:

4.11 g/l of Acryol TT935 from Rohm & Haas which is a polyacrylic acid.
1.23 g/l of H.sub.2 ZrF.sub.6
pH is 2.1

The coated panel was air dried and then baked at 190 degrees F. for about 5 minutes. The zirconium conversion coated panel was cooled and then immersed in the following water based emulsion:

2.5% Dipropylene glycol;
2.2% trimellitic anhydride;
2.5% Natralube 120,
0.56% 2-Amino-2-Methyl-1-propanol (emulsification agent); and
92.24% mixture of water and enough ammonia to reach a pH of 9.0–9.5.

After approximately 1 minute the panel was removed from the emulsion and allowed to dry at room temperature for about 10 minutes. The dried coated panel was then placed in a heat chamber which was at a temperature of 275–300 degrees F. The panel remained in the heat chamber for about 15 minutes. The panel was removed and had thereon a thin lanolin wax polyester coating. The lanolin wax polyester coated panel was allowed to cool. The cooled panel was then placed in a salt fog at 95 degrees F. according to ASTM method B-117. After 168 hours of exposure to this salt fog, the lanolin polyester coated panel showed minor signs of pitting.

EXAMPLE 10

A 3*10 inch 2024-T3 aluminum alloy panel was cleaned according to Example 1. The cleaned panel was anodized in a solution of 4% sulfuric acid and 1.0% boric acid at 80 degrees F. for about 20 minutes. The voltage was 15 volts and the current density was about 10 amps per square foot.

The anodized panel was then immersed in the following water based emulsion:

2.5% Dipropylene glycol;
2.2% trimellitic anhydride;
2.5% Natralube 210;
0.56% 2-Amino-2-Methyl-1-propanol (emulsification agent); and
92.24% mixture of water and enough ammonia to reach a pH of 9.0–9.5.

After approximately 1 minute, the coated anodized panel was removed from the emulsion and allowed to dry at room temperature for about 30 minutes. The dried coated anodized panel was then placed in a heat chamber which was at a temperature of 275–300 degrees F. The panel remained in the heat chamber for about 15 minutes. The panel was removed and had thereon a thin lanolin polyester coating. The lanolin polyester coated anodized panel was allowed to cool. The cooled panel was then placed in a salt fog at 95 degrees F. according to ASTM method B-117. After 168 hours of exposure to this salt fog, the panel showed only minor signs of corrosion.

EXAMPLE 12

A 3*10 inch panel of 2024-T3 aluminum alloy was cleaned according to Example 7. The panel was then immersed in the following water based emulsion:

10% acrylic acid—polyethylene polymer (AC-5120 sold by Allied Signal Corp.)
1.0% Dipropylene glycol,
0.1% of Natralube 210,
0.3% 2-Amino-2-Methyl-1-propanol (emulsification agent); and
2.5% light mineral oil (as plasticizer),
86.1% mixture of water and enough ammonia to reach a pH of 9.0–9.5.

The water is added to the melted base mixture at boiling point to form the emulsion. After being immersed for approximately 1 minute the panel was removed from the emulsion and allowed to dry at room temperature for about 10 minutes. The dried coated panel was then placed in a heat chamber which was at a temperature of 275–300 degrees F. The panel remained in the heat chamber for about 15 minutes. The panel was removed and had thereon a thin lanolin wax polyester coating. The lanolin wax polyester coated panel was allowed to cool. The cooled panel was then placed in a salt fog at 95 degrees F. according to ASTM method B-117. After 168 hours of exposure to this salt fog, the panel showed only minor signs of corrosion.

EXAMPLE 13

A panel of Zamak #3 cast alloy was cleaned in a mild alkine cleaner, rinsed with deionized water and dried. This alloy was purchased from Bryan Die Cast Products, Inc. of Bryan, Ohio. This alloy contains by weight 3.5 to 4.3% Al, 0.02–0.05% Mg, max of 0.25% Cu, 0.10% Fe, trace amounts of Pb, Cd and Sn, and the balance being Zn, i.e., 95.2–96%.

The cleaned cast Zn-al alloy panel was then immersed in the following water based emulsion:
  2.5% Dipropylene glycol;
  2.2% trimellitic anhydride;
  2.5% of Natralube 210,
  0.56% 2-Amino-2-Methyl-1-propanol (emulsification agent); and
  92.24% mixture of water and enough ammonia to reach a pH of 9.0–9.5.

After approximately 1 minute the panel was removed from the emulsion and allowed to dry at room temperature for about 10 minutes. The dried coated panel was then placed in a heat chamber which was at a temperature of 275–300 degrees F. The panel remained in the heat chamber for about 15 minutes. The panel was removed and had thereon a thin lanolin wax polyester coating. The lanolin wax polyester coated panel was allowed to cool. The cooled panel was then placed in a salt fog at 95 degrees F. according to ASTM method B-117. After 336 hours of exposure to this salt fog, the panel showed no signs of corrosion.

Specific embodiments of a corrosion-protected coaxial cable according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A corrosion-resistant radio-frequency coaxial cable comprising:
   an inner conductor;
   a layer of foam dielectric material surrounding the inner conductor;
   an outer conductor formed of an aluminum foil laminate surrounded by a braided aluminum wire sheath;
   the laminate including at least one layer of aluminum foil bonded to a substrate, said substrate longitudinally wrapped about the foam material;
   a jacket of weather-proofing material surrounding the braided sheath; and
   a corrosion-inhibiting coating applied directly adjacent the foil composed of a wax acid polyester and talc, said coating formed in situ, wherein an amount of talc in the dried coating comprises about between 5 percent and 20 percent by weight.

2. The cable of claim 1 wherein the laminate includes at least one layer of aluminum foil bonded to a plastic substrate with a chemical adhesive.

3. The cable of claim 2 wherein the corrosion-inhibiting coating is applied to the aluminum foil before the laminate is wrapped about the foam material.

4. The cable of claim 2 wherein the coating is applied to the aluminum foil by spraying.

5. The cable of claim 2 wherein the coating is applied to the aluminum foil by dipping prior to bonding the foil to the substrate.

6. The cable of claim 2 wherein a second layer of aluminum foil is bonded to an opposite side of the substrate.

7. The cable of claim 6 wherein the corrosion-inhibiting coating is applied to the second layer of aluminum foil.

8. The cable of claim 2 wherein a second aluminum foil laminate layer surrounds the wire braid sheath.

9. The cable of claim 8 wherein a second aluminum wire sheath surrounds the second laminate layer.

10. The cable according to claim 1 wherein an amount of talc in the dried coating comprises about 13 percent weight.

11. The cable of claim 1 wherein the wax acid polyester includes the compounds of a polybasic acid or anhydride, a polyol, and an effective amount of a lanolin wax acid to form a wax polyester in situ coating.

12. The cable of claim 1 wherein the wax acid polyester is formed by the in-situ reaction of an aqueous emulsion of a polybasic acid or anhydride, a polyol and an effective amount of a lanolin wax acid.

13. The cable of claim 1 wherein the coating has a thickness of about 0.00005 inches.

14. The cable of claim 1 wherein the coating has a thickness of about between 0.00001 inches and 0.0001 inches.

15. A corrosion-resistant radio-frequency coaxial cable comprising:
   an inner conductor;
   a layer of foam dielectric material surrounding the inner conductor;
   an outer conductor formed of an aluminum foil laminate surrounded by a braided aluminum wire sheath;
   the laminate including at least one layer of aluminum foil bonded to a substrate, said substrate longitudinally wrapped about the foam material;
   a jacket of weather-proofing material surrounding the braided sheath; and
   a corrosion-inhibiting coating applied directly adjacent the foil composed of a wax acid polyester and talc, said coating formed in situ, wherein the talc is kept in suspension in the wax acid polyester by circulation or agitation of the chemical during application to the aluminum.

* * * * *